United States Patent

[11] 3,621,252

[72] Inventor William Eddy, Jr.
 Columbus, Ohio
[21] Appl. No. 880,721
[22] Filed Nov. 28, 1969
[45] Patented Nov. 16, 1971
[73] Assignee Industrial Nucleonics Corporation
 Continuation-in-part of application Ser. No. 875,400, Nov. 10, 1969, now abandoned.

[54] PROCESS AND APPARATUS FOR DEFECT DETECTION USING A RADIOACTIVE ISOTOPE
 18 Claims, 3 Drawing Figs.

[52] U.S. Cl. .................................................. 250/71.5 R,
 250/71 T, 250/106 T
[51] Int. Cl. ..................................................... G01t 1/20
[50] Field of Search ........................................... 250/71.5,
 71 T, 83, 106 T, 71.5 R

[56] References Cited
 UNITED STATES PATENTS
 2,878,392 3/1959 Polito ............................. 250/71 T
 3,179,806 4/1965 Dixon et al. .................. 250/106 T
 3,225,193 12/1965 Hilton et al. .................. 250/71.5
 3,265,892 8/1966 Sheldon ........................ 250/71.5

OTHER REFERENCES
Arthur, Abstract of Application Serial No. 206, 829, published Feb. 26, 1952, 655 O.G. 1177 250– 83

Primary Examiner—Archie R. Borchelt
Attorneys—Marechal, Biebel, French & Bugg, William T. Fryer, III and C. Henry Peterson ABSTRACT: Detection of defects such as cracks, and the like, is accomplished by effecting adsorption of an inert gas radioisotope, e.g., krypton-85, onto the surface to be examined followed by obtaining a visible image of the radioactivity level pattern prior to desorption of the adsorbed gas. Prior to adsorption, the surface is outgassed to remove occluded gases, followed by exposure the the inert radioactive gas at essentially ambient temperature and pressure in the range of 2mm Hg to one atmosphere above 760mm. Hg. Visible images are obtained by use of fiber optics in bundle form, the fibers coated with a phosphor which emits light when exposed to the inert gas radioisotope. The bundle of fibers has a front face which conforms to the surface of the part examined, the light output being fed to a video camera whose output signal is amplified and displayed on a video display device.

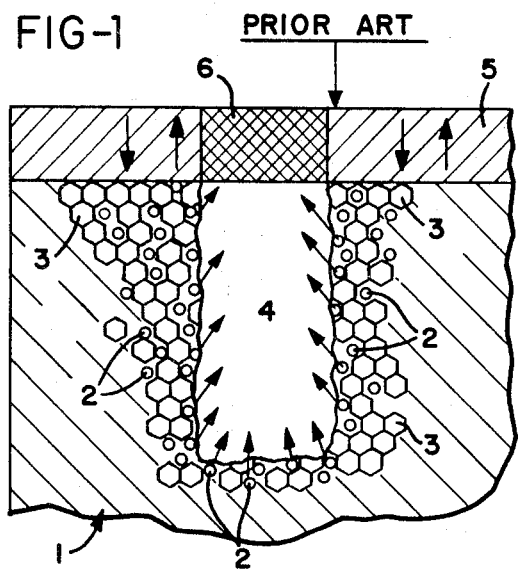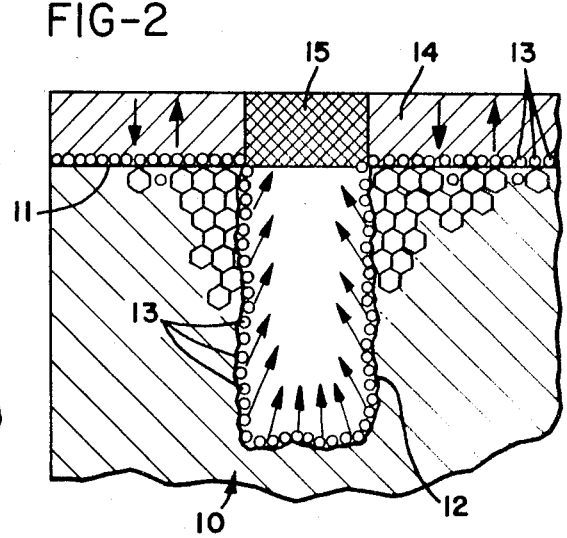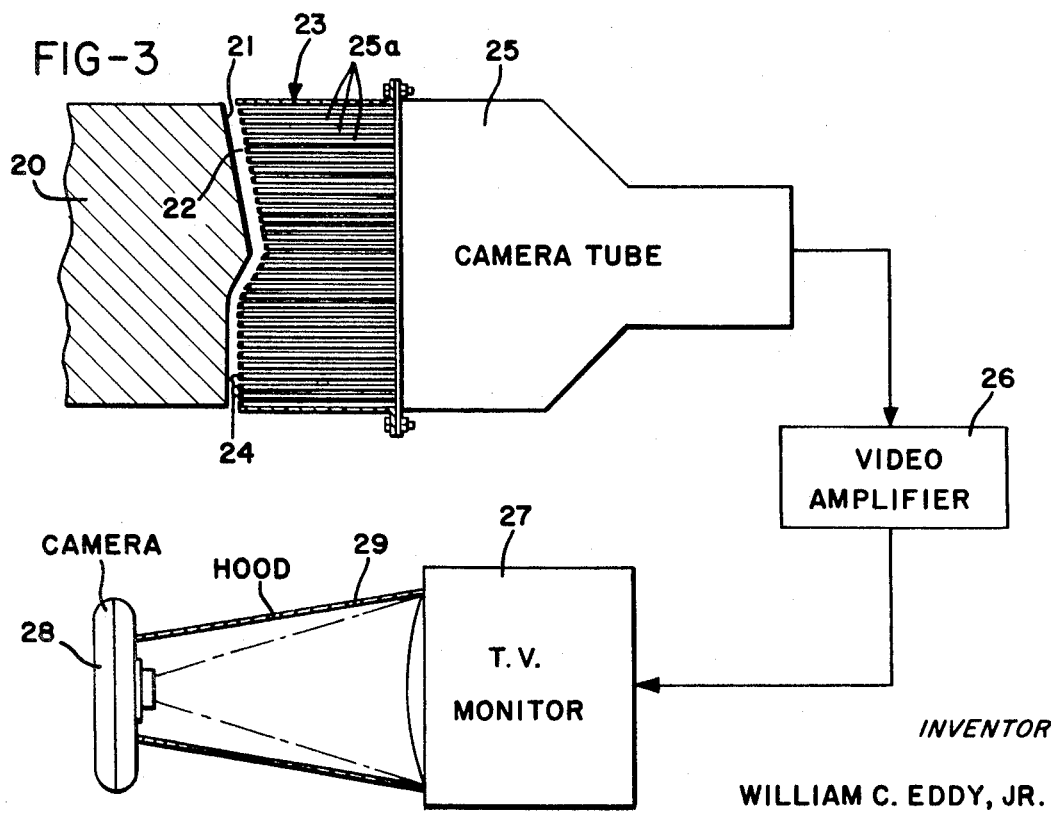

PROCESS AND APPARATUS FOR DEFECT DETECTION USING A RADIOACTIVE ISOTOPE

This application is a continuation-in-part of application Ser. No. 875,400, filed on or about Nov. 10, 1969, and assigned to the same assignee, now abandoned.

BACKGROUND OF THE INVENTION

The present invention relates to a method and apparatus for the determination of surface defects, and more specifically to an improved method wherein an adsorbed radioactive inert gas provides a radioactivity level pattern convertible to a visible image for indicating the location and size of defects.

Some prior techniques for crack detection include the use of X-ray machines, where an X-ray transmitter is placed on one side of the part and a film is placed on the other side. The X-rays reaching the film form a pattern that identifies some cracks. This technique is used mainly for internal defects of significant size.

Parts have been washed with radioactive fluids. The fluid enters surface cracks and the part surface is cleaned, to leave the radioactive fluid in the crack for detection by a suitable means. In general, only large cracks can be detected by this method.

Dyes have been used to fill surface cracks, and the surface was washed to reveal the cracks. Again, only fairly large cracks could be detected.

Radioactive gas has been used in a technique called kryptonation to locate defects in a part, such as the extent of fatigue. The part is first placed in a vacuum, and may be heated to release gases in the part. Then the part is subjected to Kr–85 gas at a high pressure and temperature in the range of 500° F. to 2,000° F., and for a long time, sometimes 2 or 3 days. The part is kryptonated, by having the krypton gas absorbed by the part, entering the void volumes left when the other gases were purged.

After kryptonation, the part is allowed to stabilize, leaving some of the krypton in the void regions. The absorbed radioactive gas on the part surface is cleaned off, for better sensitivity to the absorbed krypton. A detector is used to locate the fatigued regions, corresponding to the areas with radioactivity level. For example, an X-ray film is used.

A long film exposure time is required, usually even up to 2 or 3 days, to obtain a useful film image from the radioactivity in the part. For further description of this latter method, reference is made to application Ser. No. 609,226, filed Jan. 13, 1967, now U.S. Pat. No. 3,499,319 and assigned to the same assignee.

Each of the above procedures has some disadvantage, i.e., either insufficient sensitivity to small cracks not visible to the naked eye or by the assistance of a moderately powered microscope, or rendering the part so radioactive as to preclude its use for an extended period of time.

Accordingly, it is a primary object of the present invention to provide a simple procedure for the determination of surface defects using a radioactive inert gas wherein the part being tested is not rendered radioactive for an extended period of time.

Another object of the present invention is the provision of an improved process for surface defect detection using krypton–85 radioisotope and effecting adsorption thereof on the surface with a minimum of absorption and essentially permanent retention, and measuring the radioactivity level pattern of the adsorbed radioisotope to provide a visible image of the surface condition of the part.

Another object of the present invention is the provision of an improved nondestructive test for surface defects by radioisotope techniques wherein the part is not rendered permanently radioactive.

Another object is the provision of an improved apparatus for providing a visible image of the defects in the surface of the part wherein the defects are initially rendered "visible" by an adsorbed radioactive inert gas.

SUMMARY OF THE INVENTION

By the present invention a radioactive inert gas, e.g., krypton-85, is used and adsorbed on the surface of the part to be examined. This particular gas is well suited for use in the present invention because of its relatively small atomic diameter 3A., a 10 year half-life, emission of 662 KeV. beta and 517 KeV. gamma. This particular radioisotope has a branching ratio of 0.46 percent, that is, it emits 46 gammas for each 1,000 betas. Moreover, of the radioactive inert gases, it is readily available. Its inertness is a particularly desirable quality both from the standpoint of nondestructive testing and health since it does not readily react chemically so as to be chemically bound to tissue or on materials to which it is adsorbed.

The surface of the part to be examined is exposed to a radioactive inert gas under temperature and pressure conditions which assure maximum adsorption on the surface and a minimum of adsorption into crystal structure, i.e., interstitial penetration and retention within the part to be examined. To assure efficient surface adsorption, the part to be examined may be degassed by treatment in a vacuum so that the surface adsorbed gases are removed thereby making available sites onto which the inert gas atoms may be adsorbed.

The adsorbed inert gas occupies sites on the surface; and where a defect appears a greater amount of the gas is adsorbed thus creating a radioactive level pattern in which the areas of the defects become more highly radioactive than those areas in which there are a lesser amount of defects or no defects at all.

Since diffusion or desorption of the adsorbed gas is fairly rapid, the surface of the part is examined prior to substantial desorption in order to provide a visible image of the radioactivity level pattern attributable to the adsorbed radioactive species, thus providing a visible image of the location and size of the defects. Such examination may be conducted using fiber optics, in bundle form, each fiber being coated with a phosphor which emits light when exposed to the radiation from the surface being examined. The output of the light bundles is received by a video camera tube, the output signal of the video output tube being amplified and displayed on the cathode-ray tube. A permanent record may be obtained by photographing the face of the cathode-ray tube. Other procedures may be employed for providing a visible image as will be described hereinafter.

DESCRIPTION OF THE DRAWINGS

FIG. 1 is a schematic drawing of a prior art system utilizing absorption, i.e., retention of a radioactive inert gas for defect detection;

FIG. 2 is a schematic drawing of the system of the present invention; and

FIG. 3 is a schematic view of an apparatus for rendering the defects visible in accordance with the present invention.

DETAILED DESCRIPTION OF THE INVENTION

In accordance with the present invention an inert radioactive gas, such as krypton–85 is used to detect cracks or other surface defects in a part. The present process has several advantages, including rapid inspection; sensitivity to microscopic cracks with high contrast between defective and nondefective surface areas; easily restoring the part to an original, nonradioactive condition; and reducing the amount of radioactive gas needed to obtain useful indication of defects. The present invention may be used in the examination of any part capable of sorption of gases and retention of absorbed gases and release of adsorbed gases.

It has been found that the prior techniques do not give the best surface crack detection results and that an improved technique to be described can be used. In the prior art technique of kryptonation, the part was first cleaned by removing the gases normally in or on the part, followed by exposure to radioactive inert gas under conditions of elevated temperatures and pressures, e.g., 500° – 2,000° F., to cause absorption of the gas into the part, that is, interstitial penetration and retention of the gas in the body of the part. During this procedure some gas is adsorbed on the surface. Since this prior art procedure measures interstitially retained or absorbed gases, the surface of the part is cleaned or heated slightly to remove the atoms of the gas adsorbed on the surface. It has been found by the present invention that the adsorbed radioactive, inert gas can be used as the primary means of detecting surface cracks and that the absorbed gases should be minimized sufficiently to emphasize detection of the adsorbed gas.

The phenomenon of adsorption can be explained by first considering a part that is kryptonated for a long period at a high pressure and temperature. The radioactivity level is due to the absorption of krypton and it will remain indefinitely, subject to the normal half-life decay.

In contrast to the kryptonation process, experiments have shown that a part can be exposed to Kr–85 at a temperature, pressure, and for a time to cause primarily only adsorption on the part surface. For example, a part was cleaned of surface adsorbed gas impurities by placing it in a vacuum. The part was not heated during the outgasing process. Then, the cleaned part was exposed to Kr–85 at 13 p.s.i.a. pressure and at about 72° F. for a duration of one hour. When the radioactivity level was measured, after the part was withdrawn from the exposure to Kr–85, a sharp decrease was noted over a relatively short time. It appeared that an almost classical diffusion behavior with time was occurring. Normally, kryptonated specimens retain their radioactivity activity with time, except for the relatively slow half-life decay, whereas this part lost 90 percent of its initial measured radioactivity in 9 hours after exposure. This loss rate indicated that the residual radioactivity level would be reduced after 24 hours by a factor of almost 50. The phenomenon observed was the part had adsorbed the Kr–85 and no significant absorption had occurred. The rapid decay of the radioactivity level after exposure to Kr–85 identifies that primary adsorption occurred. Once the part can be selectively caused to adsorb the radioactive inert gas, it is possible to take advantage of the unique sensitivity of adsorbed gas to remain in cracks for a longer period and the short radioactivity duration of that portion of the gas which is adsorbed on the nondefect surface portions and desorbed in a relatively short time.

As a further explanation, reference is made to FIG. 1, that illustrates diagrammatically the action of absorbed gases in the process of kryptonation. A part 1 of some solid material, such as aluminum, is kryptonated by a process of first cleaning part 1 by placing it in a vacuum to draw off the surface and internal gases normally in part 1. Part 1 may be heated to facilitate the cleaning. Part 1 is exposed to the radioactive inert gas, such as Kr–85, at a high pressure and temperature for a prolonged period of 2 or 3 days, to cause penetration of the radioactive gas atoms 2 into the part, and absorption into the crystal lattice 3. The surface of part 1 is cleaned of surface adsorbed gas and part 1 may be heated to a preselected temperature, as a part of the cleaning or during further stages in the experiment.

Part 1 has a surface crack 4. Radiation sensitive film 5 is used to detect the radioactivity that hopefully indicates accurately the presence of crack 4. Film 5 may have to be left on part 1 for several days, for a high-resolution picture. The presence of the adsorbed and retained gas atoms 2 in the material beneath the crack and that in the material adjacent to the noncracked areas does not provide a sufficiently clear picture to locate the defect precisely perhaps due, in part to self-absorption of the emitted radiation. The dark film region 6, caused primarily by the radiation from the radioactive gas atoms 2 in the crack does not sharply define the crack size, due to the presence of absorbed gas atoms not in the crack but immediately adjacent crack 4 which provide a gray area adjacent to the dark film region. A considerable time period is required to permit part 1 to absorb the radioactive gas, and to obtain a good image on the film.

The use of adsorbed radioactive gas as a crack detection means according to the present invention is illustrated in FIG. 2. A part 10 of the same material as part 1 (FIG. 1), has its surface cleaned of surface adsorbed gases normally on the part surface, by placing part 10 in a vacuum, for example. The vacuum pulls off the surface air and other gases, but the internal gases normally in part 1 are not withdrawn to any appreciable extent. The cleaning operation is preferred to prevent desorption of absorbed contaminant gases into the krypton–85 gas material. Part 10 preferably is not heated at this time, to minimize the amount of internal gases in part 10 that are removed, for a reason to be mentioned below. The temperature and pressure during the cleaning vacuum step is selected not to permit a significant amount of internal gas from part 10 to be released.

Cleaned part 10 is exposed to the radioactive, inert gas, such as Kr–85, at a temperature, pressure and for a time period that permits primarily only adsorption of the radioactive gas on the surface 11 of part 10.

For example, part 10 is not heated; a fairly low gas pressure is used and the exposure time is short. The reason for selecting these conditions of temperature, pressure and time, is that part 10 is allowed to adsorb primarily only gas on its surface 11 and on the crack surface 12, as represented by the layer of atoms 13. As mentioned earlier, an example is to expose the part to Kr–85 at a pressure of 13 p.s.i.a. and a temperature of 70° F., for 1 hour. Various combinations of pressure, temperature and time can be used. In particular, shorter exposure times can be used, to speed up the crack inspection process.

Absorption into the crystal lattice structure of part 10 is substantially minimized. By not heating part 10 when it is exposed to the radioactive gas, the gases normally inside part 10 are not released, decreasing the likelihood of any radioactive gas replacing them. The low pressure acts to reduce the extent of diffusion of the radioactive gas into part 10, while being sufficient to cause adsorption on part surface 11. The time interval during which the exposure occurs is relatively short, again to prevent significant absorption into part 10. The shorter the exposure time interval, the faster parts can be processed and inspected. In the kryptonation processes, the objective was to obtain high absorption in the part, so the temperature and pressure were relatively high and the exposure time period long.

Different conditions may be used to effect adsorption of the gas, for example, with porous parts use of a partial vacuum, e.g., 2 mm. Hg may be desirable. For other parts, a pressure above 760 mm. Hg may be used, for example, 1 atmosphere above 760. The pressure should not, however, be increased substantially since the higher the pressure the greater the tendency toward absorption rather than adsorption. Moreover, temperatures above about 200° F. tend to increase the absorption. To limit absorption the part is not heated appreciably prior to treatment so as to drive off interstitially occluded gases. In other words, by purposely retaining interstitially occluded gases such as oxygen, nitrogen, e.g., the radioactive inert gas cannot occupy the space left by removal of the interstitially occluded gas.

Due to the small diameter of the krypton atom, it is theoretically possible to cause adsorption which provides detectable surface concentrations in defects of about 10A. and larger. Krypton–85, however, is usually supplied as a mixture of 5 percent krypton–85 in krypton–84, and thus, the theoretical sensitivity can be approached only by using pure krypton–85. By this process, defects as small as submillionths of an inch have been detected using the commercially available radioisotope.

By the present invention, the initial application of vacuum, for cleaning the surface of the part, removes the gases which form a small number of atom layers on the surface. The removal of these atom layers of nonradioactive gas can be accelerated by moderate heating or by ion bombardment. When the part is thereafter exposed to krypton-85, the radioactive inert gas atom is rapidly adsorbed in place of the surface gases previously present, much in the same way that a liquid "wets" a surface. The radioactive inert gas also wets the exposed surfaces of the cracks. Since the inert gas is adsorbed there is an interchange in which atoms of the radioactive inert gas leave the surface and are replaced by atoms of another and a nonradioactive gas. This, in part, explains the somewhat rapid decrease in surface concentration in 8 to 9 hours and the initial appreciable reduction in radiation count of about 50 percent.

Nothwithstanding the changes which take place, the adsorption of gases, and the minimum absorption of gases provide a level of radioactivity which is the sum of both. The desorption of the adsorbed gases decreases the radioactivity in a relatively short time whereby the residual radioactivity is small and a function of the small amount of absorbed gas. It is the adsorbed radioactive inert gas, however, which forms a radioactivity level pattern on the surface of the part as a function of the presence and location of any defects therein.

Accordingly, the next step is to obtain a measurement of this radioactivity level pattern on the surface. Because of the desorption phenomenon, measurement must be undertaken quickly in order to provide a visible picture of the radioactivity level pattern on the surface.

Assuming, for explanatory purposes, that a radiation film 14, sensitive and fast enough can be used, to respond to the short duration of the adsorbed layer of adsorbed atoms 13, on part surface 11, the size of crack 12 would be represented by the darkened film region 15 adjacent to a white film region, rather than an adjacent gray area as previously described where absorbed gases are detected. The film picture would show a sharp outline of the crack surface 12, as compared to the picture from the kryptonated part 1 shown in FIG. 2.

The reason for this sharp contrast (dark and adjacent white areas, or vice versa depending on whether a positive or negative print is made) will be understood from the following. In the case of measurement of absorbed gases, the gas atoms retained in the area of the crack or other defect have adjacent atoms retained in the nondefect areas. Thus, the film, referring to the previous illustration, receives radiation from both sources producing gray and dark areas.

In the procedure of this invention, the radioactive gas atoms adsorbed on the surface readily diffuse away while those in the defect diffuse away at a slower rate because the bulk volume into which they may diffuse is considerably smaller. Thus in the process of diffusing out of one surface of the crack, some of the atoms are adsorbed on the other surface or a different portion of the same surface. In a sense, diffusion kinetics favor retention of activity within small defects or cracks by virtue of desorption and a somewhat high incidence of readsorption in the defect surface, depending upon the kind of defect, the size and the nature thereof and the physical and chemical nature of the part.

In practice, however, although the gas remains in the crack or defect 12 for a longer period than on the surface, the time period is still rather short and it is difficult to detect the small cracks using normal radiation sensitive film and because of the manipulative steps involved. A period of 3 hours at the least would be required, normally. Another form of radiation image detector with a fast response time was required. The radiation image detector should take an almost instantaneous picture of the radioactivity level pattern on the part, in say 20 seconds, at a time before substantially all of the adsorbed gas has diffused out of crack 12. Experiments show that the radioactivity level is highest during the period immediately after exposure to the krypton. The radioactivity level at this time is higher than the level after the radioactivity level of a kryptonated specimen is stabilized and ready for autoradiograph. The image detector would give the clearest picture at the time of highest radioactivity level.

The advantages of responding to the adsorbed gases on part 10, in addition to the sharper picture, include the fact that part 10 can be cleaned of radioactivity quickly. The adsorbed layer diffuses away naturally to a large extent under atmospheric conditions in a relatively short period of time. Further, the adsorbed gas can be cleaned away easily by washing techniques, since it is primarily only on part surface 11 and in crack 12, and in a short period of time only in crack 12 due to surface desorption. The short time required to remove the radioactive gas helps in speeding up the inspection of parts to an assembly line rate. Parts are ready for packing or use almost immediately after inspection.

A preferred form of fast response radiation image detection means is the system, as shown in FIG. 3. Part 20 has been processed with the technique described in connection with FIG. 2. It has an irregularly shaped surface 21 that matches the irregular contoured face 22 of a radiation image detector 23. Basically, radiation image detector 23 is a video camera 25 that converts the radioactivity pattern on part surface 21 to an optical light visible picture, by means of a phosphor coating 24 on the face of each of the fibers making up fiber optics bundle 25a. In order to provide high resolution and efficient light gathering, relatively small diameter fibers are used, for example, 20 microns or less in diameter. Each fiber has one end face coated with a phosphor used for high-efficiency beta detection, the phosphor layer being 0.003 inch in thickness.

The individual light impulses over the area of phosphor coating 24 are discretely transmitted to discrete, corresponding areas at the face of a video camera transmitting tube 25, to obtain high resolution. The output of the video camera 25 is amplified in video amplifier 26 and the light picture seen at the face of phosphor coating 24 is recreated by a cathode ray tube or TV monitor 27. Pictures of the light pattern can be taken by camera 28, attached to a light-shielding hood 29. The camera tube 25 may be one such as a Westinghouse Wx32000 camera tube.

Radiation image detector 23 has the advantage of presenting almost instantaneously the radioactivity pattern on part surface 21. A very low level of radioactivity is required to present a useful picture, because very high amplification is available in camera 25, video amplifier 26, and in monitor 27. Since only a low radiation level is needed, the layers of adsorbed gas atoms 13 (FIG. 2) alone on part 11 can provide a sufficient radiation level. The relatively short duration of the adsorbed layers of atoms 13, is sufficient to give the necessary information, and a rapid inspection process can be achieved with part 11 having relatively little radioactivity in a reasonably short time after inspection. Moreover, the system shown in FIG. 3 is faster than known film systems by a factor of about $10^4$.

Other methods which may be employed to provide a visible picture include painting the part with a contrast material such as white paint immediately after adsorption, followed by dipping the painted part in a photographic emulsion and developing the print. This procedure, although not as fast as that previously described offers advantages where the surface to be examined is of a complex shape.

As the present invention has been described in one form, it is apparent that it can be used in other arrangements. A system and method for the continuous inspection of parts can be achieved, since the process disclosed reduces the time required for inspection and facilitates the early use of the parts after inspection.

While the processes and forms of apparatus herein described constitute preferred embodiments of the invention, it is to be understood that the invention is not limited to these precise processes and forms of apparatus, and that changes may be made therein without departing from the scope of the invention which is defined in the appended claims.

What is claimed is:

1. The process of examining a part for determining the presence and location of surface defects such as cracks and the like comprising the steps of: exposing the surface of the part to be examined to a gaseous atmosphere at least a portion of which contains a radioactive inert gas, said exposing step being conducted at a temperature and pressure that substantially allows only adsorption of said gas and said inert gas on said surface while not allowing significant absorption of said gas and said inert gas in said part, said surface of said part after said exposing step having a radioactivity level that decreases substantially in a relatively short time due to diffusion of said adsorbed radioactive inert gas, said adsorbed radioactive inert gas forming a radioactivity level pattern on the surface being examined which is a function of the presence and location of defects, and examining said surface of said part and the radioactivity level pattern on said part surface due to said adsorbed radioactive inert gas in the time period before said substantial decrease in said adsorbed radioactive inert gas to determine the difference in level of radioactivity on the surface of said part as an indication of the presence and location of surface defects.

2. The process as set forth in claim 1 wherein said examining step includes obtaining a visible image of said radioactivity level pattern on said part surface.

3. The method, as described in claim 1, wherein said part surface is cleaned by placing said part in a vacuum to remove normally adsorbed gas on said part surface, at a temperature that substantially minimizes the release of normally absorbed gas from within said part.

4. The method, as described in claim 1, wherein said exposure step includes placing said part in a region of said radioactive, inert gas at a pressure that causes adsorption of said gas on said part surface, and without increasing the temperature of said part, to minimize the release of gases normally absorbed in said part and thereby minimize the absorption of said radioactive gas in said part.

5. A process for determination of defects in the surface of a part wherein said part is capable of sorption of gases and retention of absorbed gases and release of adsorbed gases, comprising the steps of:

a. exposing said part to a radioactive inert gas at a temperature, pressure for a period of time sufficient to allow adsorption of said inert gas while maintaining the absorption thereof to a minimum, said part after exposure to said inert gas having a level of radioactivity which is the sum of the radioactivity of said absorbed and adsorbed inert gas, said level of radioactivity decreasing substantially in a relatively short time due to desorption of the adsorbed inert gas whereby the residual level of radioactivity is small and a function of the small amount of retained absorbed inert gas, b. said radioactive inert gas which is adsorbed on the surface of said part forming a radioactivity level pattern on said part surface as a function of the presence and location of said defects, and c. obtaining an image of said radioactivity level pattern on said part surface prior to substantial desorption of said adsorbed inert gas for providing a visible image of the presence and location of said surface defects.

6. A process as set forth in claim 5 wherein the surface of the part to be examined is cleaned prior to said exposure step.

7. A process as set forth in claim 6 wherein said cleaning operation includes exposing the surface to be examined to a vacuum to remove adsorbed surface gases.

8. A process as set forth in claim 5 wherein said defect being determined is a crack.

9. A process as set forth in claim 5 wherein said radioactive inert gas is krypton–85.

10. A process as set forth in claim 7 wherein heat is applied during exposure to vacuum.

11. A process as set forth in claim 5 wherein said part is exposed to said gas at a temperature of less than about 200° F. and wherein said pressure is between 2 mm. of Hg and 1 atmosphere of pressure above 760 mm. Hg.

12. A process as set forth in claim 11 wherein said part is exposed to said gas at ambient temperature and pressure.

13. A process as set forth in claim 5 wherein said step of obtaining a visible image of the presence and location of said surface defects is performed prior to the lapse of three hours after said exposing step.

14. A process as set forth in claim 12 wherein said part is exposed to said inert gas at ambient temperature and pressure for a period of about 1 hour.

15. A process as set forth in claim 5 wherein the step of obtaining said image includes the steps of positioning adjacent said part a bundle of optical fibers, the front of said bundle having a contour fitting the contour of the surface to be examined and the front of each fiber being coated with a phosphor, positioning a video camera in light receiving relation with the other end of said fiber optic bundle whereby the light image from said bundle illuminates the light-sensitive face of said camera to produce an electrical output, amplifying said electrical output, utilizing the amplified electrical output to provide visible image of said radioactivity level pattern.

16. A process as set forth in claim 15 wherein the amplified electrical signal is fed to a video display device to provide a visible image of said radioactivity level pattern.

17. A process as set forth in claim 16 further including the step of obtaining a permanent record of the visible image displayed by said video display device.

18. A process as set forth in claim 5 wherein said visible image is obtained by applying a contrast material to said surface, followed by application thereto of a coating of photographic emulsion sensitive to the radiation emitted by said radioactive inert gas, and developing said coating of emulsion.

* * * * *